United States Patent [19]

Kim

[11] Patent Number: 5,555,029
[45] Date of Patent: Sep. 10, 1996

[54] METHOD AND APPARATUS FOR POST-PROCESSING DECODED IMAGE DATA

[75] Inventor: Sang-Ho Kim, Seoul, Rep. of Korea

[73] Assignee: Daewoo Electronics Co., Ltd., Seoul, Rep. of Korea

[21] Appl. No.: 508,643

[22] Filed: Jul. 28, 1995

[30] Foreign Application Priority Data

Jul. 29, 1994 [KR] Rep. of Korea .................. 94-18660

[51] Int. Cl.$^6$ .................................................. H04N 5/21
[52] U.S. Cl. .................. 348/607; 348/625; 382/268; 382/262
[58] Field of Search .................................. 348/571, 607, 348/625, 624, 708, 630; 358/21 R, 36, 37, 160, 167, 166; 382/260, 262, 266, 268; H04N 5/14, 9/64, 5/21, 5/213

[56] References Cited

U.S. PATENT DOCUMENTS 5,280,350  1/1994  DeHaan et al. .................. 348/607

OTHER PUBLICATIONS

Scene Adaptive Coder; IEEE Transactions on Communications, vol. Com. 32 No. 3, Mar. 1984; William K. Pratt, Senior Member IEEE.
A Motion–Compensated Interframe Coding Scheme For Television Pictures; IEEE Transactions on Comm. Vol. Com–30, #1, Jan./1982; Y. Ninomiya & Y. Ohtsuka.

Fixed & Adaptive Predictors For Hybrid Predictive/Transfor Coding; IEEE Transactions on Communications vol. Com–33, No. 12, Dec./1985; S. Ericsson.

Primary Examiner—Safet Metjahic
Assistant Examiner—Sherrie Hsia
Attorney, Agent, or Firm—Anderson Kill Olick & Oshinsky, P.C.

[57] ABSTRACT

A post-processing filter apparatus for use in an image signal decoding system, capable of improving the image quality of the system, comprises a memory for storing decoded image data of a current frame; a controller for assigning each pixel value included in the stored decoded image data as a target pixel value in sequence, the target pixel value representing the value of a target pixel to be filtered, and for producing information representing the position of the target pixel; a pixel region determinator for generating a selection signal representing whether or not the target pixel belongs to a boundary region of a block in the stored decoded image data by using the position information of the target pixel, wherein the boundary region denotes a region which includes pixels placed along the boundary of the block; a filtering device for selectively filtering the target pixel value in response to the selection signal to thereby produce a filtered target pixel value; a updating circuit for updating the target pixel value with the filtered target pixel value; and a circuit for retrieving the updated pixel value when all of the pixels contained in the decoded image data have been updated.

4 Claims, 3 Drawing Sheets

METHOD AND APPARATUS FOR POST-PROCESSING DECODED IMAGE DATA

FIELD OF THE INVENTION

The present invention relates to a post-processing method and apparatus for use in an image signal decoding system; and, more particularly, to a method and apparatus capable of removing a blocking effect present at the boundary of a block of decoded image data by effectively post-processing the decoded image data, to thereby improve the quality of the image produced by the system.

DESCRIPTION OF THE PRIOR ART

In various electronic/electrical applications such as high definition television and video telephone systems, an image signal may need be transmitted in a digitized form. When the image signal is expressed in the digitized form, there is bound to occur a large amount of digital data. Since, however, the available frequency bandwidth of a conventional transmission channel is limited, in order to transmit the image signal therethrough, the use of an image encoding system often becomes necessary to compress the large amount of digital data. Among various video compression techniques, the so-called hybrid coding technique, which combines temporal and spatial compression techniques together with a stastical coding technique, is known to be most effective.

Most hybrid coding techniques employ an adaptive inter/intra mode coding, othogonal transform, quantization of transform coefficients, RLC (run-length coding), and VLC (variable length coding). The adaptive inter/intra mode coding is a process of selecting a video signal for a subsequent othogonal transform from either PCM (pulse code modulation) data of a current frame or DPCM (differential pulse code modulation) data adaptively, e.g., based on a variance thereof. The inter-mode coding, also known as the predictive method, which is based on the concept of reducing the redundancies between neighboring frames, is a process of determining the movement of an object between a current frame and its one or two neighboring frames, and predicting the current frame according to the motion flow of the object to produce an error signal representing the difference between the current frame its prediction. This coding method is described, for example, in Staffan Ericsson, "Fixed and Adapted Predictors for Hybrid Predictive/Transform Coding", *IEEE Transactions on Communications,* COM-33, No. 12, pp. 1291–1301 (December 1985); and in Ninomiya and Ohtsuka, "A Motion-compensated Interframe Coding Scheme for Television Pictures", *IEEE Transaction on Communications,* COM-30, No. 1, pp. 201–210 (January 1982), both of which are interpolated herein by reference.

The othogonal transform, which exploits the spatial correlationships between image data such as PCM data of the current frame or motion compensated DPCM data and reduces or removes spatial redundancies therebetween, converts a block of digital image data into a set of transform coefficients. This technique is described in, e.g., Chen and Pratt, "Scene Adaptive Coder", *IEEE Transactions on Communications,* COM-32, No. 3, pp. 225–232 (March 1984). By processing such transform coefficient data with quantization, zigzag scanning, RLC, and VLC, the amount of data to be transmitted can be effectively compressed.

The encoded image data is transmitted through a conventional transmission channel to an image signal decoder of an image signal decoding system within a receiver, which performs a reverse process of the encoding operation to thereby reconstruct the original image data. The reconstructed image data may contain an annoying artifact such as a blocking effect wherein the border line of a block becomes visible at the receiver. Such blocking effect occurs since a frame is encoded on a block-by-block basis.

As is well known in the art, to improve the quality of the reconstructed image data or decoded image data, generally, the decoded image data is further processed by employing a post-processing filter. A commonly used prior art post-processing filter performs repetitive filtering of the decoded image data based on respective filtered image data to thereby enhance the quality of the decoded image data.

However, as the post-processing filtering is carried out without due regard paid to a spatial activity of each block included in the decoded image data, such filtering may not substantially reduce the blocking effect at the boundary of the block or may generate distorted image data.

Another type of post-processing technique for use in reducing the blocking effect is disclosed in a copending commonly assigned application, U.S. Ser. No. 08/496,588, "POST-PROCESSING METHOD AND APPARATUS FOR USE IN AN IMAGE SIGNAL DECODING SYSTEM". This technique provides an improved performance of reducing the blocking effect at the boundary of a block of decoded image data by post-processing it based on the spatial activity of the block. Since, however, the post-processing technique performs the filtering operation of the decoded image data without considering the position of each pixel contained in the block, it may not always provide a satisfactory post-processing for the decoded image data.

SUMMARY OF THE INVENTION

It is, therefore, a primary object of the invention to provide a post-processing method and apparatus for use in an image signal decoding system capable of considerably reducing or eliminating the blocking effect present at the boundary of a block of decoded image data by effectively post-processing the decoded image data in accordance with the position of each pixel contained in the block, thereby improving the quality of the image in the system.

In accordance with one aspect of the invention, there is provided a method, for use in an image signal decoding system, for post-processing, on a pixel-by-pixel basis, decoded image data of a current frame from an image signal decoder included in the image signal decoding system, comprising the steps of:

(a) storing the decoded image data of the current frame;

(b) assigning each pixel value included in the stored decoded image data as a target pixel value in sequence, said target pixel value representing the value of a pixel to be filtered, and producing information representing the position of the target pixel;

(c) generating a selection signal indicating whether or not the target pixel belongs to a boundary region of a block in the decoded image data by using the position information of the target pixel, wherein the boundary region denotes a region which includes pixels placed at the boundary of the block;

(d) selectively filtering the target pixel value in response to the selection signal to thereby produce a filtered target pixel value;

(e) updating the stored target pixel value with the filtered target pixel value; and (f) repeating said steps (b) to (e) for a next target pixel until all of the pixels included in the decoded image data of the current frame are post-processed.

In accordance with another aspect of the invention, there is provided an apparatus, for use in an image signal decoding system, for post-processing, on a pixel-by-pixel basis, decoded image data of a current frame from an image signal decoder included in the image signal decoding system, which comprises:

means for storing the decoded image data of the current frame;

means for assigning each of pixel data included in the stored decoded image data as target pixel data in sequence, said target pixel data representing the value of a pixel to be filtered, and for producing information representing the position of the target pixel data;

means for generating a selection signal indicating whether or not the target pixel data belongs to a boundary region of a block corresponding to the target pixel data contained in the decoded image data by using the position information of the target pixel data, wherein the boundary region denotes a region which includes pixels along the boundary of the block;

means for selectively filtering the target pixel value in response to the selection signal to thereby produce filtered target pixel value;

means for updating the target pixel value stored in the storage means with the filtered target pixel value; and means for retrieving the updated pixel value when all of the pixels contained in the decoded image data have been updated.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENTS

Figure 1:
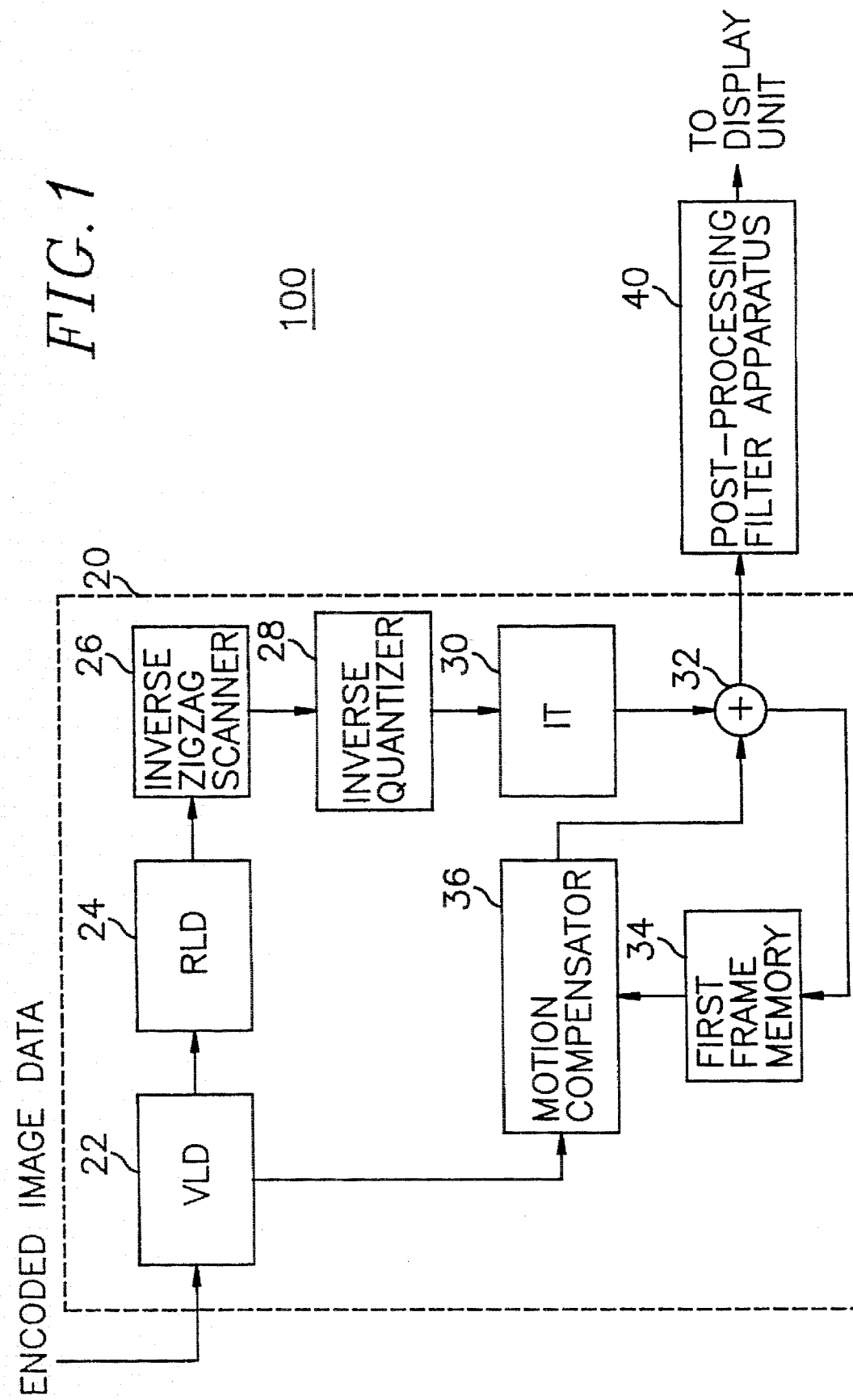
FIG. 1 shows a block diagram of an image signal decoding system employing a post-processing filter apparatus of the present invention.

Referring to FIG. 1, there is shown a novel image signal decoding system 100 for explaining the post-processing method and apparatus of the present invention. The image signal decoding system 100 comprises an image signal decoder 20 and a post-processing filter apparatus 40, wherein the image signal decoder 20 includes a variable length decoder (VLD) 22, a run-length decoder (RLD) 24, an inverse zigzag scanner 26, an inverse quantizer 28, an inverse transformer (IT) 30, an adder32, a first frame memory 34 and a motion compensator 36.

In the image signal decoder 20, encoded image data, i.e., a set of variable length coded transform coefficients and motion vectors, is provided to the VLD 22 on a block-by-block basis. The VLD 22 serves to decode the set of variable length coded transform coefficients and the motion vectors to provide the run-length coded transform coefficients thereof to the RLD 24 and the motion vectors to the motion compensator 36, respectively. The VLD 22 is basically a look-up table: that is, in the VLD 22, a plurality of code sets is provided to define the respective relationships between the variable length codes and their run-length codes or motion vectors. Thereafter, the run-length coded transform coefficients are applied to the RLD 24, which is also a look-up table, for generating zigzag scanned transform coefficients. The zigzag scanned transform coefficients are then provided to the inverse zigzag scanner 26.

At the inverse zigzag scanner 26, the zigzag scanned transform coefficients are reconstructed to provide blocks of quantized transform coefficients. Each block of quantized transform coefficients is then converted into a set of transform coefficients at the inverse quantizer 28. Subsequently, the set of transform coefficients is fed to the IT 30, e.g., inverse discrete cosine transformer, which transforms the set of transform coefficients into a set of difference data between a block from a current frame and its corresponding block from a previous frame. The set of difference data is then sent to the adder 32.

In the meanwhile, the motion compensator 36 extracts a set of pixel data from the previous frame stored in the first frame memory 34 based on a motion vector, which corresponds to in block in the current frame, from the VLD 22 and provides the set of extracted pixel data to the adder 32. The set of extracted pixel data from the motion compensator 36 and the set of pixel difference data from the IT 30 are then summed up at the adder 32 to thereby provide reconstructed image data of a given block of the current frame. Thereafter, the reconstructed image data or decoded image data of the block is supplied to the first frame memory 34 for the storage thereof and the post-processing filter apparatus 40 for the post-processing thereof.

At the post-processing filter apparatus 40 of the present invention, post-processing of the decoded image data from the adder 32 is carried out to effectively filter the decoded image data; and, thereafter, the post-processed image data is transmitted to a display unit (not shown).

Figure 2:
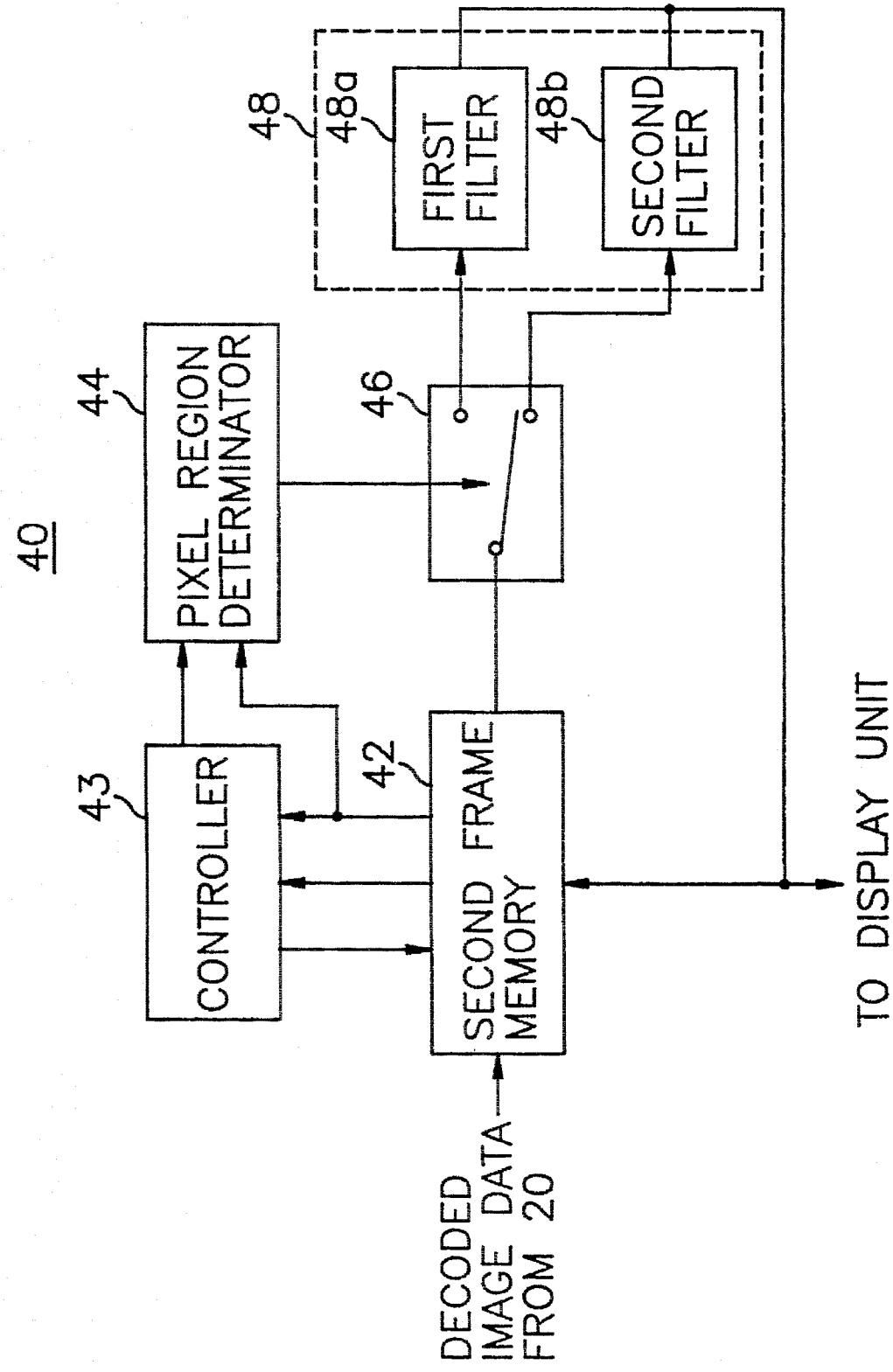
FIG. 2 represents a detailed block diagram of the post-processing filter apparatus shown in FIG. 1.

Turning now to FIG. 2, there is illustrated a detailed block diagram of the post-processing filter apparatus 40 shown in FIG. 1 for explaining the post-processing scheme of the present invention.

The post-processing filter apparatus 40, which comprises a second frame memory 42, a controller 43, a pixel region determinator 44 and a filtering device 48, serves to provide the post-processed image data of the decoded image data by filtering each of the pixels included therein on a pixel-by-pixel basis.

In the inventive post-processing scheme, the decoded image data of the current frame from the image signal decoder 20 shown in FIG. 1 is first applied to the second frame memory 42 for the storage thereof. In response to a first memory control signal MCS1 from the controller 43, the value of a target pixel stored in the second frame memory 42 is read and supplied to the controller 43 and the pixel region determinator 44, while the values for its neighboring N×N, e.g., 3×3, pixels are fed to a switching circuit 46, wherein the target pixel denotes the pixel to be filtered and is located at the center of the N×N pixels, N being a positive integer.

The controller 43, which monitors the target pixel supplied from the second frame memory 42 and the storage state of pixel data therein, generates position information corresponding to the target pixel and also provides the first, a second and a third memory control signals MCS1, MCS2 and MCS3 in order to control the operation of the second frame memory 42. Subsequently, the position information of the target pixel generated at the controller 43 is sent to the pixel region determinator 44 which is adapted to determine a region of the target pixel.

Figure 3:
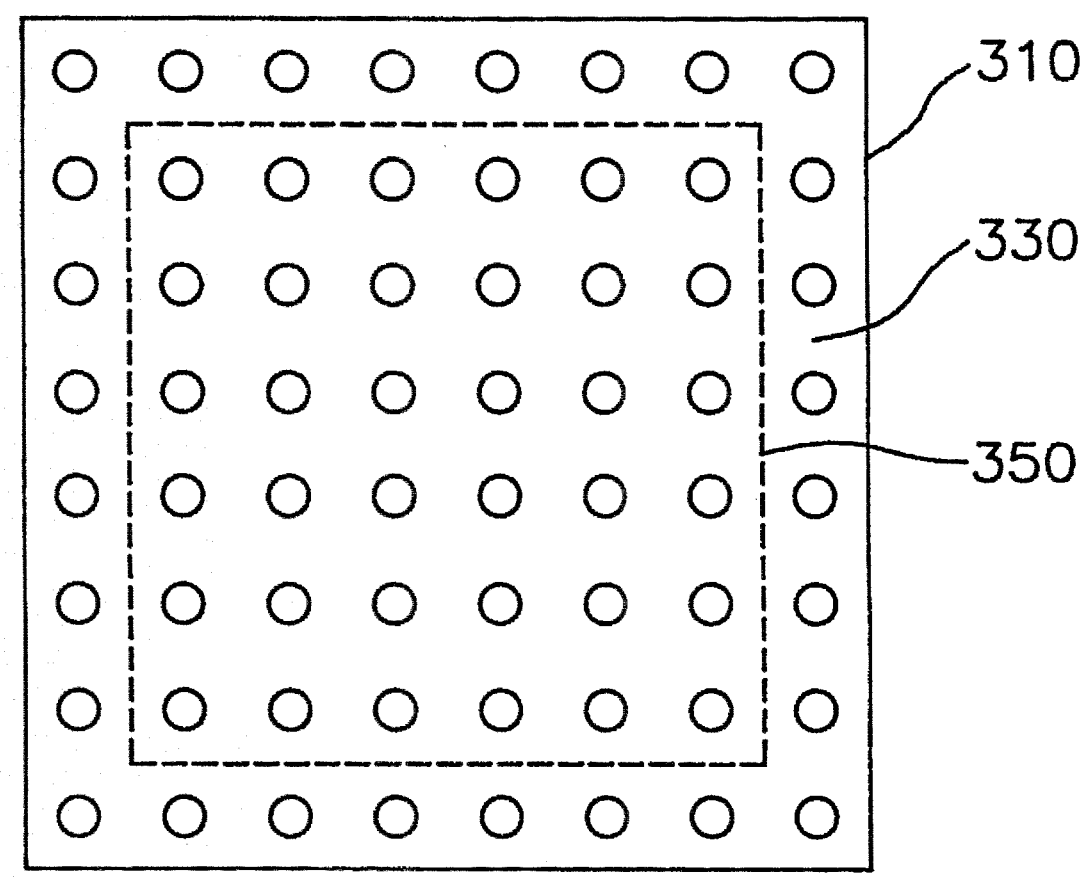
FIG. 3 presents an exemplary diagram explaining how a region for each target pixel included in decoded image data is defined.

Using the position information of the target pixel provided from the controller 43, the pixel region determinator 44 generates a selection signal indicating whether or not the target pixel from the second frame memory 42 belongs to a boundary region of a block corresponding to the target pixel included in the stored decoded image data. As illustrated in FIG. 3, if the target pixel belongs to a boundary region, e.g., 330, of a block 310 having 8×8 pixels, the pixel region determinator 44 produces a logic high selection signal; and, if the target pixel does not belong to the boundary region 330, i.e., the target pixel exists outside the boundary region, e.g., 350 of the block 310, it generates a logic low selection signal. Thereafter, the selection signal produced at the pixel region determinator 44 is fed to the switching circuit 46 in order to control the operation thereof.

In response to the selection signal from the pixel region determinator 44, the switching circuit 46 selectively couples the N×N pixels including the target pixel provided from the second frame memory 42 to a first filter 48a or a second filter 48b of the filtering device 48. Specifically, in response to the logic high selection signal, the N×N pixels are coupled to the first filter 48a; and, in response to the logic low selection signal, the N×N pixels are connected to the second filter 48b.

In a preferred embodiment of the present invention, the first filter 48a is adapted to filter the target pixel with a first predetermined cutoff frequency CF1 to thereby generate substantially filtered target pixel data, whereas the second filter 48b serves to filter the target pixel with a second predetermined cutoff frequency CF2 to thereby provide lesser filtered target pixel data than that from the first filter 48a, wherein CF1<CF2. Each of the first and the second filters may be implemented by employing such digital filters as Median and Laplacian filters well known in the art.

It should be noted that the cutoff frequencies of the first and the second filters can be determined based on the required image quality of the image signal decoding system. The target pixel data filtered at the first filter 48a or the second filter 48b is fed to the second frame memory 42 in response to the second memory control signal MCS2 from the controller 43 to thereby update the stored target pixel data with the filtered target pixel data and provide the updated target pixel data to the display unit. Subsequently, in response to the third memory control signal MCS3 from the controller 43, next target pixel data and its neighboring N×N pixel data stored in the second frame memory 42 are retrieved to the controller 43 and the pixel region determinator 44, and to the switching circuit 46, respectively, thereby initiating the post-processing operation for the next target pixel data.

As a result, the present invention is capable of substantially reducing or eliminating blocking effects that may be present at the boundary of a block of decoded image data by effectively performing the post-processing filtering operation thereof based on the position data of each pixel in the block, thereby improving the image quality.

While the present invention has been shown and described with respect to the particular embodiments, it will be apparent to those skilled in the art that many changes and modifications may be made without departing from the spirit and scope of the invention as defined in the appended claims.

What is claimed is:

1. A method, for use in an image signal decoding system, for post-processing, on a pixel-by-pixel basis, decoded image data of a predetermined number of pixels in a current frame from an image signal decoder included in the image signal decoding system, comprising the steps of:

(a) storing the decoded image data of the current frame;

(b) assigning each pixel value included in the stored decoded image data as a target pixel value in sequence, said target pixel value representing the value of a target pixel to be filtered, and producing information representing the position of the target pixel;

(c) generating a selection signal indicating whether or not the target pixel belongs to a boundary region of a block in the stored decoded image data by using the position information of the target pixel, wherein the boundary region denotes a region which includes pixels placed along the boundary of the block;

(d) selectively filtering the target pixel value in response to the selection signal to thereby produce a filtered target pixel value;

(e) updating the target pixel value with the filtered target pixel value; and (f) repeating said steps (b) to (e) for a next target pixel until all of the pixels included in the decoded image data of the current frame are post-processed.

2. The method according to claim 1, wherein said step (d) for selectively filtering the target pixel value is carried out by using Median filters with different cutoff frequencies.

3. An apparatus, for use in an image signal decoding system, for post-processing, on a pixel-by-pixel basis, decoded image data of a current frame from an image signal decoder included in the image signal decoding system, which comprises:

means for storing the decoded image data of the current frame;

means for assigning each of pixel value included in the stored decoded image data as a target pixel value in sequence, said target pixel value representing the value of a target pixel to be filtered, and for producing information representing the position of the target pixel;

means for generating a selection signal indicating whether or not the target pixel belongs to a boundary region of a block in the stored decoded image data by using the position information of the target pixel, wherein the boundary region denotes a region which includes pixels placed along the boundary of the block;

means for selectively filtering the target pixel value in response to the selection signal to thereby produce a filtered target pixel value;

means for updating the target pixel value with the filtered target pixel value; and means for retrieving the updated pixel value when all of the pixels contained in the decoded image data have been updated.

4. The apparatus according to claim 3, wherein said means for selectively filtering the target pixel value is carried out by using Median filters with different cutoff frequencies.

* * * * *